March 2, 1926.
W. R. CLARK
METAL EXTRUDING MACHINE
Filed Feb. 25, 1921
1,574,792
5 Sheets-Sheet 1
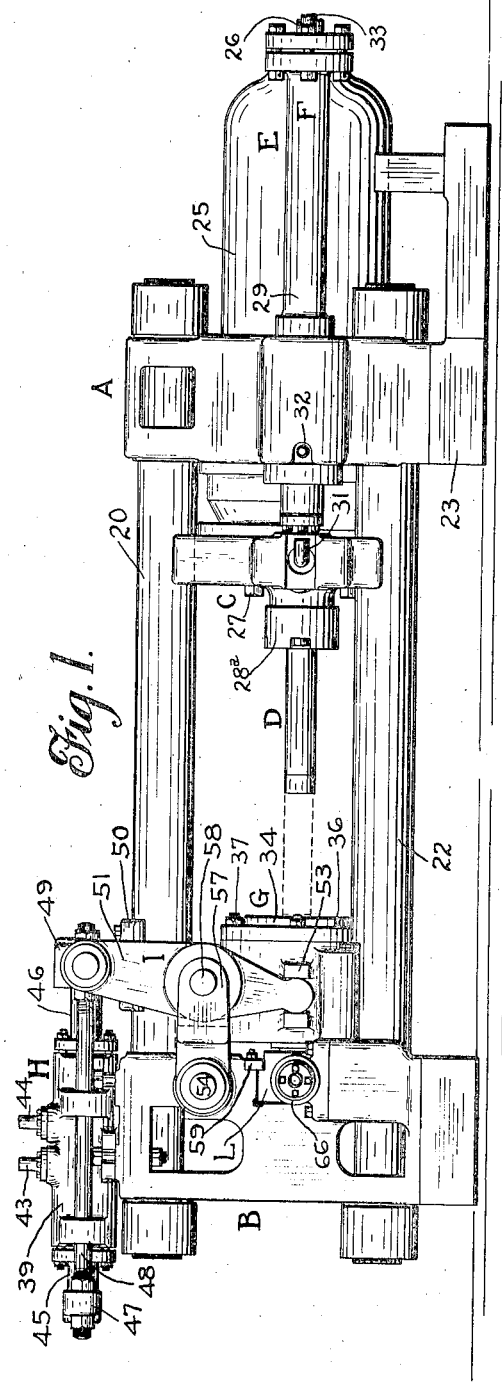
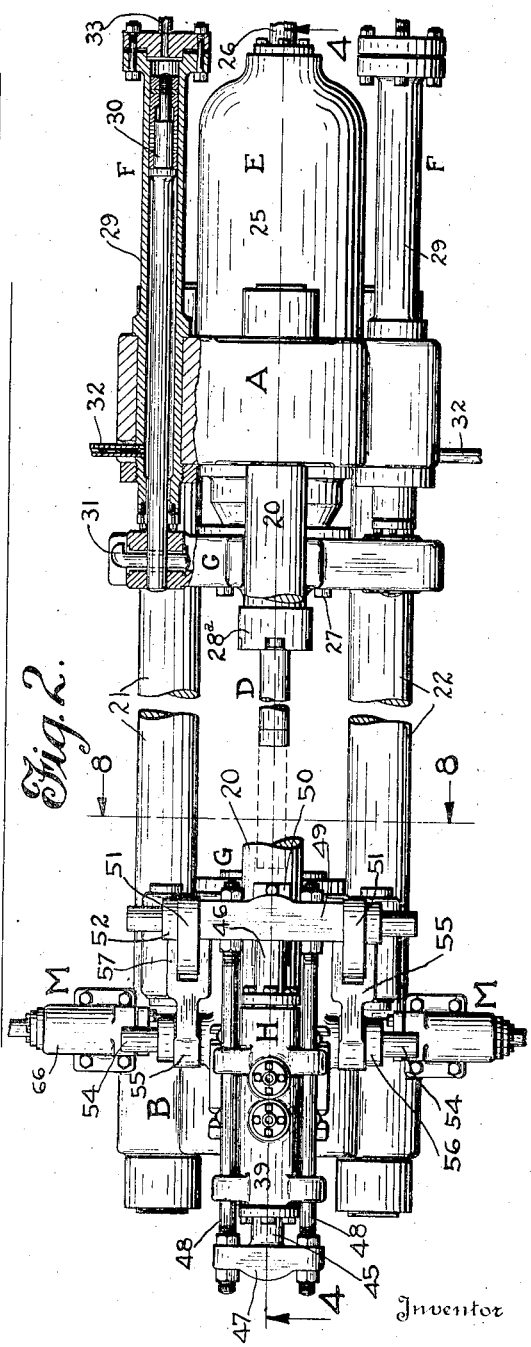
Inventor
Walter R. Clark.
By
Attorney

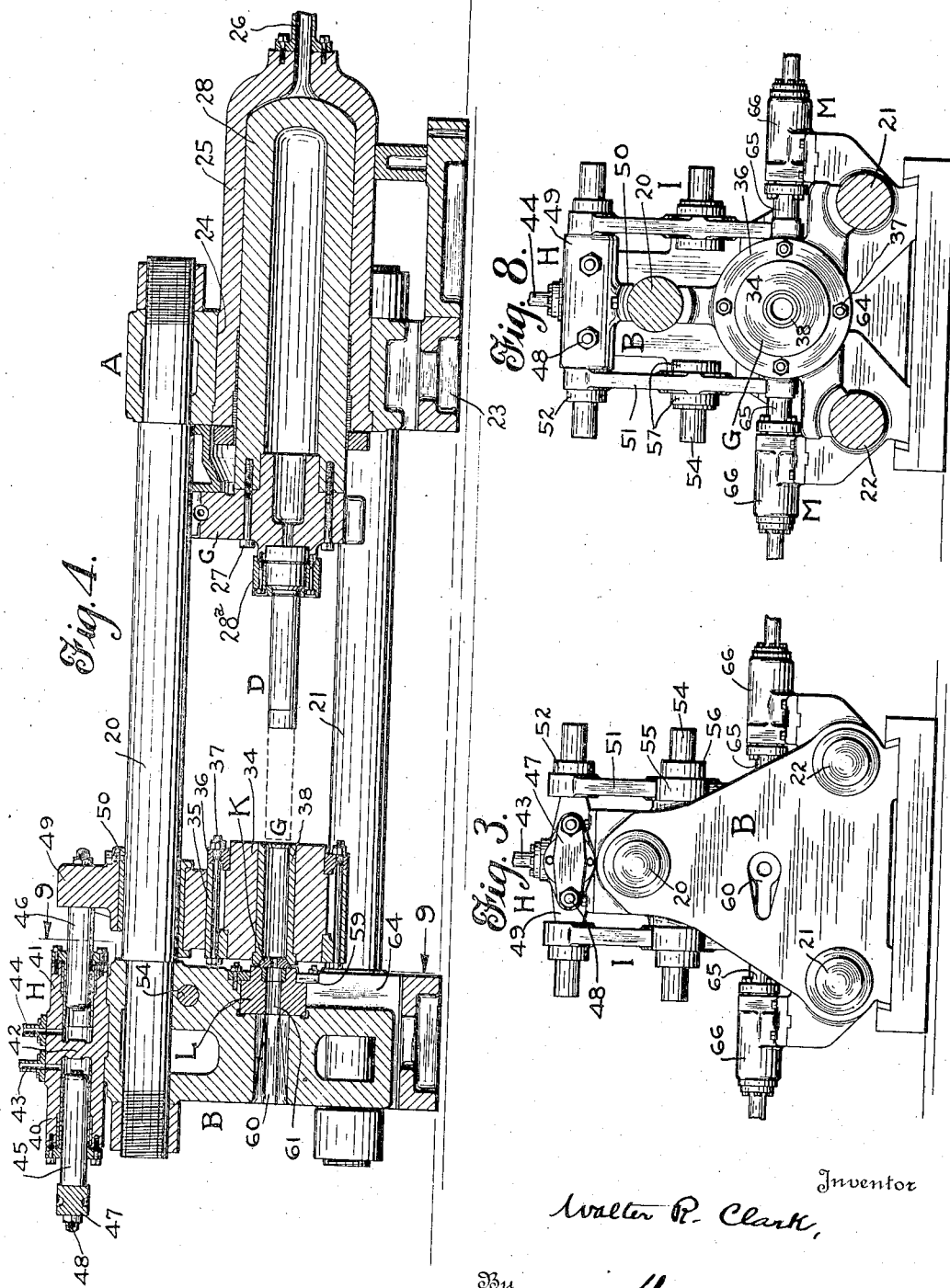

March 2, 1926.
W. R. CLARK
METAL EXTRUDING MACHINE
Filed Feb. 25, 1921
1,574,792
5 Sheets-Sheet 3
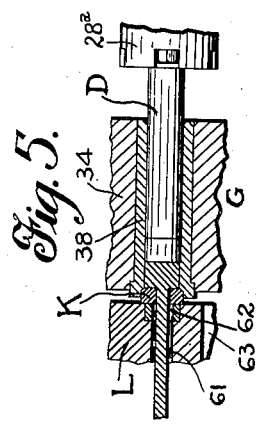
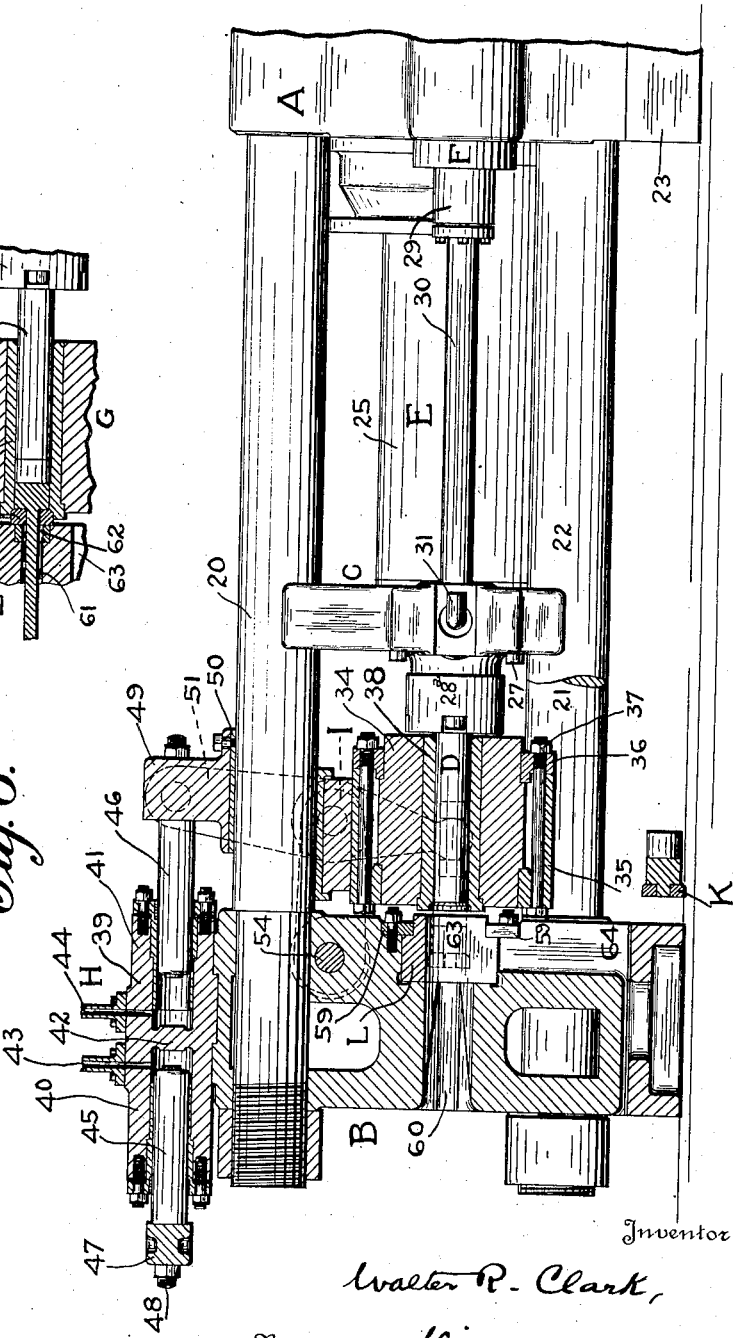
Inventor
Walter R. Clark,
By
Attorney

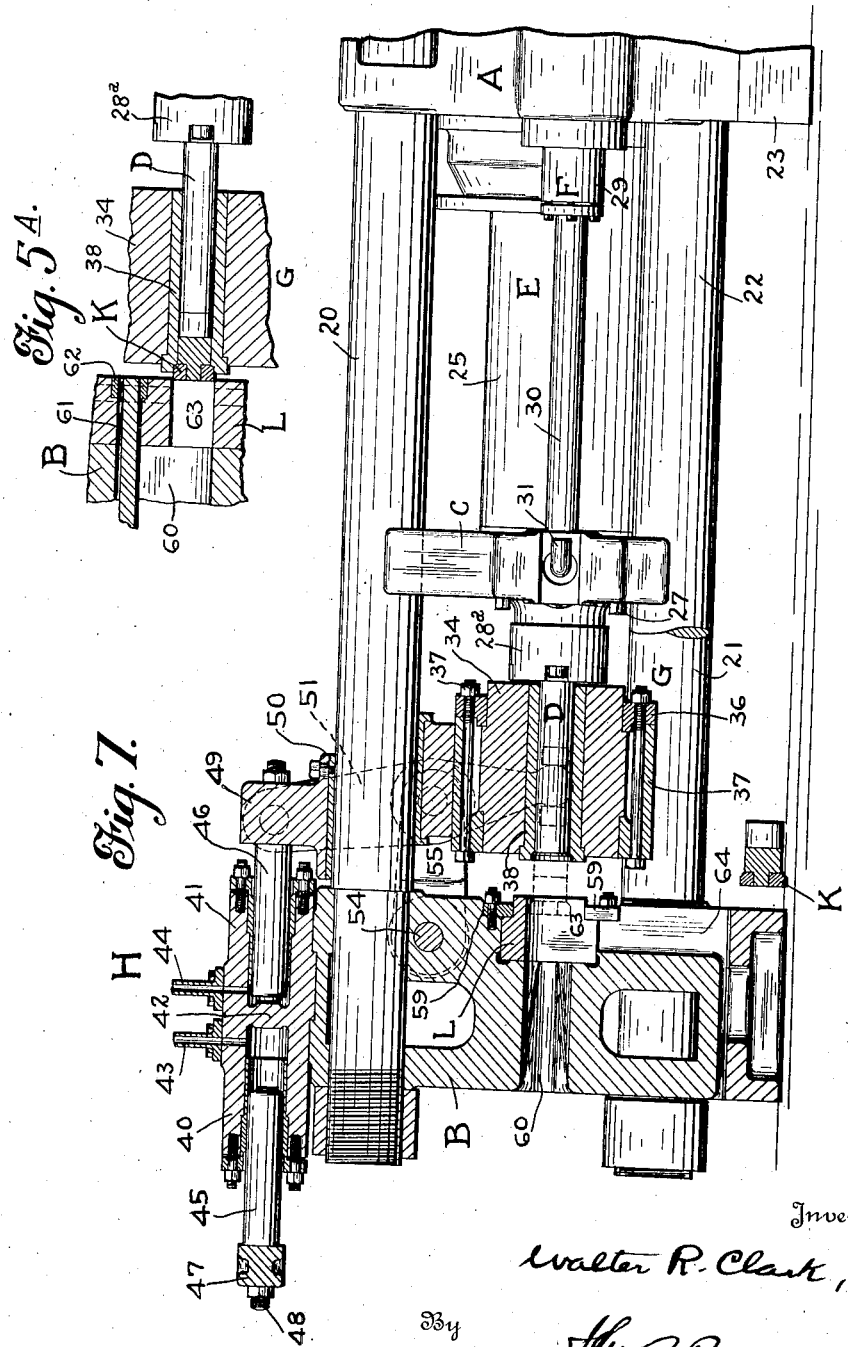

March 2, 1926. 1,574,792
W. R. CLARK
METAL EXTRUDING MACHINE
Filed Feb. 25, 1921 5 Sheets-Sheet 5
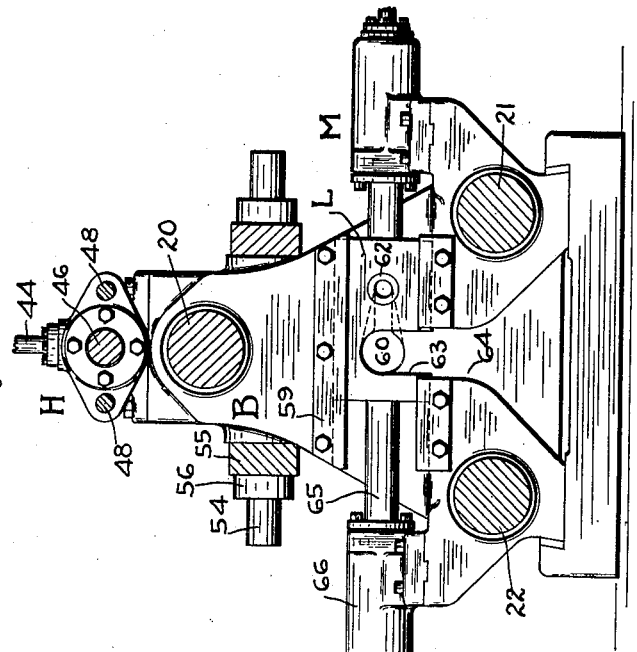
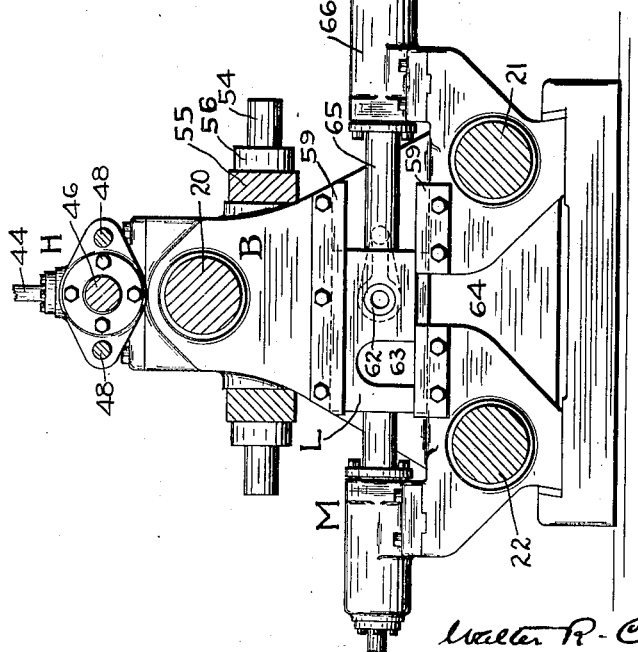
Inventor
Walter R. Clark,
By
Attorney Patented Mar. 2, 1926.

1,574,792

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT.

METAL-EXTRUDING MACHINE.

Application filed February 25, 1921. Serial No. 447,666.

*To all whom it may concern:*

Be it known that I, WALTER R. CLARK, a citizen of the United States, residing in Bridgeport, in the county of Fairfield and State of Connecticut, have invented certain new and useful Improvements in Metal-Extruding Machines, of which the following is a full, clear, and exact description.

This invention relates to machines for extruding metal. While particularly applicable to the extrusion of brass and other non-ferrous metals, in the manufacture of rods and tubes, the invention is not limited in this respect.

One object which I have in view is the increased efficiency of the machine and its convenience of operation and the simplicity and accessibility of the several parts.

A more specific object is the furnishing of a machine in which the die is readily removable and in which in fact the die is ejected with the stump, the die mounting being very accessible, so that a new die can be easily and quickly placed for a subsequent operation. A number of dies are provided and as these are used successively, and as the dies adhering to the stumps can be readily removed therefrom at any convenient time, for further use, the operation of the machine can be speeded up, the new dies being placed in position with maximum facility and convenience.

Another object is to provide improved means for severing the finished piece from the unextruded portion or stump of the billet.

Other advantages of my improved machine consist in the possibility of removing the stump very conveniently from the container after the completion of the extrusion stroke, and more particularly in the possibility of removing or ejecting the stump from the billet container by different methods of operation, as dictated by conditions governing the particular case.

Further advantages arise from the improved method of mounting the die backing, improved means for shifting the billet container relatively to the other parts of the machine when desired, and the improved structure of the press as a whole.

With these and other objects in view, the invention consists in the novel features and combinations of parts to be hereinafter described and claimed.

In the accompanying drawings:

Fig. 1 is a side elevation of a machine embodying my improvements, the parts being in a position to commence the operation of forming a billet into a rod;

Fig. 2 is a top plan view of the machine shown in Fig. 1, certain parts being broken away for the sake of clearness;

Fig. 3 is an end elevation of the machine looking from the left of Fig. 1;

Fig. 4 is a vertical longitudinal section of the machine, with the parts in the position indicated in Fig. 1;

Figs. 5 and 5^A are detail horizontal sections showing different stages of the operation;

Fig. 6 is a vertical longitudinal section on an enlarged scale of the discharge end of the machine, showing the positions occupied by the parts at the end of the working stroke, the stump being ejected by a movement of extra length imparted to the ram;

Fig. 7 is a similar view, indicating an alternative method of ejecting the stump;

Fig. 8 is a section on line 8—8 of Fig. 2;

Fig. 9 is a section on line 9—9 of Fig. 4, showing the position of the backing block or bolster for the die during the extrusion; and Fig. 10 is a view similar to Fig. 9, showing the position of the die backing block when the finished rod has been sheared off and the stump has been or is about to be ejected from the billet container.

The machine selected for illustration comprises in its general features an end frame A at what may be termed the ram end of the machine, an end frame B at what may be termed the discharge end of the machine, and tie rods 20, 21 and 22 extending horizontally between said end frames and tying them together. Mounted on and guided by the tie rods just mentioned is a crosshead C carrying an extruding ram D. The crosshead and ram are given a stroke inwardly relatively to the machine frame by a hydraulic cylinder and piston device generally indicated at E, such device being associated with the end frame A, and smaller hydraulic cylinder and piston devices F, also associated with the end frame A, provide for the return stroke of the crosshead and ram to the initial position, such as that shown in Fig. 1.

In line with the ram D and located adjacent the end frame B is a billet container G, into which is introduced the billet that is to be extruded by the ram. In the operative position, the billet container is in approximate contact with the inside face of the end frame B. The container is guided for horizontal movement in line with the ram on the rods 20, 21 and 22, as hereinafter more particularly described. It is arranged to be shifted by a hydraulic device H, mounted on top of the end frame B and connected with the billet container by a lever arrangement indicated generally at I. The die K is associated with the discharge end of the container G and is adapted to be alined with a laterally shiftable die backing block or member L, mounted in or associated with the end frame B and capable of being moved transversely of the machine by a hydraulic cylinder and piston device M, which in this instance is mounted upon the end frame B.

Turning now to a more detailed description of the parts above enumerated, it will be observed that the end frame A is mounted upon a suitable base 23 and that it has a horizontal opening or socket 24, in which is mounted the cylinder 25 of the hydraulic device E, said cylinder being secured to the end frame in any suitable manner. The particular connections for the water or other fluid pressure medium need not be described in detail, but it will be observed that in the particular form shown a water connection 26 is provided at the right hand end of cylinder 25. The cylinder is mounted at about the middle of the end frame A in an approximately central position and the upper tie rod 20 is located in line with the cylinder but somewhat above it. The tie rods 21 and 22 are mounted below the cylinder, one on either side. Thus the rods 20, 21 and 22 form in conjunction a guide frame which is substantially triangular, or in other words, the tie rods are located at the respective apices of a triangle. On the frame thus provided the crosshead C previously mentioned is guided for horizontal movement. This crosshead is secured in any suitable manner, as by bolts 27, to the forward end of a hollow piston 28, located in the cylinder 25, so that as the pressure medium is admitted to said cylinder (the parts being in the position shown in Fig. 4) the crosshead and its ram will be thrust toward the billet container. The crosshead C has suitable curved bearing blocks, by which it engages the tie rods so as to be guided thereon. The ram D is preferably secured to the crosshead by a detachable connection 28ª embodying a clamping collar and suitable bolts so that when the ram is worn out another one can be readily substituted.

In Fig. 2 one of the hydraulic devices F for effecting the return stroke is shown in section and it will be observed that the cylinder 29 of each device F contains a piston 30, the rod of which is suitably keyed at 31 to the side portion of the crosshead C. There are two of the devices F mounted on opposite sides respectively of the cylinder 25. The cylinders 29 are considerably smaller than the cylinder 25, but the axes of all three cylinders are in the same horizontal plane. The cylinders 29 are mounted in suitable bores or openings of the end frame A in a manner generally similar to that of mounting the cylinder 25. I have not considered it necessary to describe in detail the pressure fluid connections for the cylinders 29, but it will be understood that cylinders of small diameter are used for the purpose of producing a quick return movement of the ram after it has finished its working stroke and that with this in view the pistons 30 connected with the crosshead at the respective sides are moved to the right (Fig. 2) by the admission of pressure fluid to the left hand ends of the respective cylinders 29, say at 32, in any appropriate manner, the pressure fluid being exhausted at the right hand ends of the respective cylinders as indicated at 33.

The billet container G is guided on the frame rods 20, 21 and 22, in line with the ram, by means of suitable bearing members extending outward from the body or frame of the container, and presenting suitable curved smooth surfaces conforming to the surfaces of the respective rods. As shown for example in Fig. 6, the container comprises a sleeve 34, located centrally of the container frame and removably held in place therein by clamping rings 35 and 36 and clamping bolts 37. Inside the member or sleeve 34 is the usual separate lining member 38. At its rear end the lining member 38 is provided with a shallow tapered counterbore, in which the die K is seated and whereby the die is held concentric with the sleeve.

As previously stated, the billet container G is shiftable lengthwise by means of a hydraulic device H, on top of end frame B connected with said container by a lever mechanism I. The hydraulic device includes, in the form shown, a duplex cylinder constituted by a casting 39, in which separate cylinders 40 and 41 are arranged in line with each other, the common axis of said cylinders being located lengthwise of the machine in the median line thereof. The casting 39 is secured to the top of the end frame by suitable lugs and bolts, which it is not necessary to describe in detail. The cylinders 40 and 41 are shut off from each other by an intermediate wall or web 42 in the cylinder casting; and pressure fluid can be admitted and exhausted from cylinder 40 through a pipe 43, while the other cylinder 41 has a similar pipe connection 44. A cylindrical piston 45 is located within cylinder 40 and a similar piston 46 is located within cylinder 41. The outer end of piston 45 is secured to a crosshead 47 located at the left hand end of the machine (Fig. 2), and rods 48 tie this crosshead to a crosshead 49 with which the piston 46 is made rigid. The result of the arrangement is that the pistons and crossheads move together as a unit in a horizontal direction either toward the right or left, depending upon the manner in which the fluid pressure connections are manipulated. The crosshead 49 has a suitable bearing 50 on the upper surface of frame rod 20, so that said crosshead is suitably supported and guided in its reciprocating movement. The ends of the crosshead 49 are reduced and over them are fitted the perforated ends of levers 51, one of said levers being located at each side of the machine. Each lever is held in place on the crosshead for pivotal movement relatively thereto by a suitable collar 52. The levers 51 extend downwardly from the crosshead on opposite sides of the billet container into cooperating relation with the latter and constitute the main actuating members of the lever mechanism I previously mentioned. At its lower end, each lever 51 extends between lugs 53 on the side of the billet container, the lower end of the lever being suitably rounded to fit between the lugs and form in effect a pivotal connection while permitting a vertical sliding motion of the lever relative to the lugs.

Intermediate of its ends each of the levers 51 has a fulcrum on the machine frame, that is to say, the lever is so fulcrumed on the machine frame that as its upper end is moved in one direction by the hydraulic device H its other end will be moved in the opposite direction, carrying with it the billet container G. In the particular form shown the fulcrum of each lever 51 is a movable fulcrum and the construction is substantially as follows: Extending outwardly from the sides of the end frame B is a pivot rod 54, which extends completely through the end frame transversely of the machine and presents outwardly extending pivots on which are mounted links 55. These links are secured in place on the pivot rod by suitable collars 56, the arrangement being such that the links are free to swing in a vertical plane about the axis of the rod 54, which is embraced by the perforated ends of the links. At their opposite ends the links are provided with forked portions 57 which straddle the intermediate portions of the respective levers 51 and are pivoted thereto by suitable pivot pins 58. By this arrangement the fulcrum of each lever 51 is given a certain amount of play and there is a certain amount of play between the lower end of the lever and the lugs 53 on the billet container, so that as the cross head 49 is moved in a straight line in one or the other direction by the hydraulic device H the lever mechanism I will swing freely without binding or cramping and thereby shift the billet container to the desired position.

The die backing member L, previously mentioned, consists of a block or bolster which is guided horizontally and transversely of the machine at the inside face of the end frame B. For this purpose the end frame has a suitable guideway cut therein, in which the backing block is detachably held by removable flanges 59. This guideway communicates with an opening 60 through the end frame, through which the extruded rod or tube is discharged, and the opening 60 is adapted to aline with a bore 61 passing transversely through the die backing in line with the die opening. In the front end portion of the bore 61 is a ring 62. This is arranged at the inlet mouth of the backing block. This ring serves, at least in part, as a backing for the die and it also serves as a means for cutting off the finished work from the stump left in the billet container, as hereinafter described. By preference the bore 61 in the backing block should be somewhat larger than the die opening, as shown in Fig. 5, and the inner diameter of the ring 62 should be about the same as the diameter of the bore 61. In the form shown, the ring 62 has an outer diameter somewhat less than the outer diameter of the die and when the parts are in position for extruding the billet, as shown in Fig. 5, the die is supported rearwardly by the ring 62 and to a slight extent also by the main portion of the backing block L. Various changes may be made in this respect, however, without departure from the scope of my invention. It is preferable to make the ring 62 a separate member, but in some cases it might be integral with the backing block. It should be made of high speed steel to withstand the high heat to which it is subjected and in view of the temperature and wear to which it is subjected it is preferable to make this ring a separate part readily insertable into the bore in the die backing.

To one side of the ring 62 in the backing block is a clearance opening 63 in said block, as shown more particularly in Figs. 9 and 10. This clearance opening 63 is adapted to be brought into registry with a clearance opening 64 in the bottom part of the end frame B when the backing block is shifted from the extruding position shown in Fig. 9 to the stump ejecting position shown in Fig. 10, so that the stump may be forced out of the end of the billet container into the opening 63 and may then drop down out of the machine through the opening 64.

The member L is shifted in its guideway by any appropriate means. In the present instance its ends are connected by rods 65, with pistons (not shown) of hydraulic cylinders 66 located at the respective sides of the machine. I have not shown these cylinders in detail, but it will be obvious that they can be readily connected up so as to bring about the movement of the backing block from the position shown in Fig. 9 to that shown in Fig. 10 and back again, for which purpose provision may be made for admitting pressure fluid to either cylinder while simultaneously providing for the exhaust of the other cylinder. It will be obvious, however, that various changes in this part of the mechanism may be made without departing from the scope of the invention.

The operation of the machine is substantially as follows:

The billet container being empty, the die backing member L is brought to the position shown in Fig. 9, where the ring 62 is in line with the ram D. The die ring K may be readily placed in its socket when the billet container is shifted away from the end frame B to a sufficient extent by the actuating mechanism H, I, the operation of which is as previously described. The die being inserted in the rear end of the container, said container is then shifted by the the mechanism H, I, to the left relatively to Fig. 6, so that the die is brought up against the backing, said die being substantially concentric with and abutting against the ring 62, as previously described. The billet is then introduced into the front end of the billet container, being pushed into the same by the ram, which is moved toward and into the billet container by the hydraulic device E. As the ram is advanced into the container the billet (which is preliminarily heated, as usual) is extruded to form a rod, as shown in Fig. 5. In some cases tubes may be extruded, but in the particular case under discussion I have assumed that a rod is to be formed. The billet having been extruded to the desired extent (it generally being desirable to leave an unextruded portion or stump of predetermined size), the movement of the ram is arrested. The backing block L is then shifted from the position shown in Fig. 9 to that shown in Fig. 10, while the die is held tightly against the backing by the devices H and I. As the ring 62 is moved laterally by one or more of the pressure devices 66, the finished rod is sheared off between the cooperating contacting surfaces of the ring 62 and the die K and the finished rod is moved over laterally to another position in the discharge opening in the end frame B, in which new position it is out of line with the billet container. The finished piece is then pulled out of the backing block and the opening 60 in the end frame.

For expelling the stump from the container the advance movement of the ram can be continued, that is to say, the ram can be given a short extra stroke in the same direction, so as to push out the stump, and with it the die K, which embraces the short sprue. The ram may push out the stump into the opening 63 of the backing block so that it may fall out of the opening 64 to the floor, as shown in Fig. 6.

If desired, however, the ejection of the stump may be effected by displacement of the billet container while the ram remains stationary, that is, while the ram remains where it stopped at the limit of the extruding movement. By shifting the billet container to the right (Fig. 7) by its actuating mechanism H, I, the stump, being held from movement toward the right by the end of the ram, may be caused to fall out of the left hand end of the billet container as said container is shifted relatively to the ram and stump. Either method of ejecting the stump may be successfully employed. When the method shown in Fig. 7 is adopted, the movement of the billet container not only causes the stump to be ejected but also places the container in position for the placing of a new die. A new die is preferably used for each operation, within certain limits, a fairly large number of the dies being provided by preference, so that a fairly long run may be made without the necessity of removing the dies which have been used from the stumps to which they adhere. If desirable, however, a small number of dies can be used, as it is an easy matter comparatively to separate the die from the stump, owing to the fact that where my new method of operation is employed the sprue is very short. Inasmuch as the rod is cut off at the rear face of the die, or very near it, the sprue is only of about the same length as the die opening.

When the extruding operation has been completed and the stump ejected from the billet the die backing block may be returned to its initial position in an obvious manner. The ram D is returned by the hydraulic devices F to its initial position and another die being inserted in the container in the manner previously described, the operation is repeated.

It will be seen from the foregoing description that the die may be very readily placed in position. As different dies are used for making rods and tubes of different diameters the machine may be readily changed over to produce an article having the profile desired. It will be seen also that the construction and operation of the machine are considerably simplified by providing for the cutting off of the finished piece by the die backing member itself rather than by a separate cutting instrumentality. The stump can be ejected by an extra forward movement of the ram without moving the billet container, or by a backward movement of the container relatively to the ram, as may be desired.

The machine is of relatively simple design and very efficient in operation, entailing a minimum amount of manual labor on the part of the operatives.

Various changes may be made in the details of construction without departure from the principle of my invention as set forth in the claims.

What I claim is:

1. In a machine of the character described, end frames, horizontal rods tying said frames together, a ram crosshead guided on said rods, a container for the billet guided on said rods, means for severing the finished piece from the stump adjacent the rear face of the container, and means for shifting the billet container longitudinally.

2. In a machine of the character described, end frames, horizontal rods tying said frames together, a ram crosshead guided on said rods, a container for the billet slidably mounted between said end frames, and means mounted upon one of said end frames for shifting said container toward and away from said frame, said means including a lever, one end of which is pivoted to a slidable member.

3. In a metal extruding machine, upright end frames, guide rods connecting said frames, a ram, means for operating the same, a billet container mounted on the guide rods, and a power operated lever for shifting the billet container lengthwise.

4. In a metal extruding machine, end frames, horizontal tie rods securing said frames together, a billet container supported and guided in the space between the rods for horizontal movement, and means mounted upon one of said end frames for shifting the container toward and away from said frame, said means including a power operated lever system.

5. In a metal extruding machine, end frames, horizontal tie rods securing said frames together, a billet container supported and guided in the space between the rods for horizontal movement, and means for shifting the billet container into and out of abutment with one of said end frames, comprising a fluid pressure device mounted on top of said end frame and operatively connected by a lever to the billet container.

6. In a machine of the character described, an end frame, guide rods projecting horizontally therefrom, a billet container mounted on said rods for horizontal movement, a lever system for shifting the billet container toward and away from the end frame, and means for operating said lever system.

7. In a machine for extruding metal, a fixed frame, a movable frame, one of said frames having a billet chamber and adapted to be abutted against the other, a die adapted to be held at one end of the chamber and a die holding member to cooperate with the billet chamber, guided in the other frame, and transversely movable to release the die.

8. In a machine for extruding metal, a billet container, a die removably associated with the end portion of said container, and a die backing transversely movable relatively to the die.

9. In a machine for extruding metal, a fixed frame, a billet container movable toward and away from the same and having a removable die carried thereby, and a transversely movable die backing member mounted in the fixed frame.

10. In a machine for extruding metal, a die backing member adapted to sever the finished piece from the stump.

11. In a machine of the character described, a die backing member adapted to sever the finished piece from the stump at a point adjacent the rear face of the die.

12. In a machine of the character described, a billet container, a ram, a die, and a transversely movable die backing member adapted to sever the finished piece from the stump.

13. The method of extruding metal, which consists in placing a removable die in the end of a billet container, supporting it therein while simultaneously extruding metal through the die opening and then shearing off the finished piece at a point substantially flush with the outer face of the die.

14. The method of extruding metal, which consists in placing a removable die in the end of a billet container, supporting it therein while simultaneously extruding metal through the die opening and then shearing off the finished piece at a point substantially flush with the outer face of the die, by giving the die backing member a lateral movement.

15. The method of severing the finished piece from the stump in a metal extruding machine, which consists in shifting the die backing transversely relatively to the stump.

16. The method of extruding metal which includes extruding the metal through a transversely movable shearing ring, and then moving said ring to sever the extruded metal from the remainder.

17. The method of severing the finished piece from the stump in operating a metal extruding machine, which comprises extruding the metal through a shearing ring and then shifting the shearing ring laterally after the extrusion has taken place.

18. A machine of the character described having a movable ram, a movable container and a backing member for the container, wherein the stump may be ejected by an extra advance movement of the ram, or by a backward shifting of the container relatively to the ram.

19. A machine of the character described, having a frame member with a guideway disposed transversely of the machine, a die backing member mounted in said guideway, and means for shifting said die backing member relatively to the die.

20. In a metal extruding machine, a frame, a billet container and a ram movable longitudinally of the frame to cooperate therewith, means for severing the finished piece from the stump adjacent the rear face of the billet container and means for thereafter shifting the billet container longitudinally of the frame.

21. The method of severing the finished piece from the stump, in operating a metal extruding machine, which comprises producing a relative transverse movement between the billet container and the die backing so as to shear off such piece.

22. The method of extruding metal, which comprises placing a die against one end portion of a billet container, extruding metal through the die opening while suitably supporting the die, cutting off the finished piece and then ejecting the stump with the die adhering to the sprue.

23. In a machine for extruding metal, a billet container, a die associated therewith, and a die backing member to hold said die in the container and transversely movable while holding said die in position.

24. In a machine for extruding metal, a billet container, a die, and a die backing member for holding said die in operative position, said member being transversely movable while said parts are in metal extruding position.

25. In a machine for extruding metal, a billet container, and means for expelling the stump from the container while the latter is in extruding position.

26. In a machine for extruding metal, a die, and a die backing transversely movable across the rear face of the die.

27. In a machine for extruding metal, a billet container, a die associated with an end portion thereof and means to sever the finished piece from the stump at a point adjacent the rear face of the die.

28. In a machine for extruding metal, a billet container, a die associated therewith, a ram to extrude a billet through the die, and means to expel the stump from the container by a continued forward motion of the ram, while the container is held in extruding position.

29. In a machine for extruding metal, a billet container, a ram to extrude metal therefrom, and means to expel the stump without movement of said container from extruding position.

30. In a machine for extruding metal, a billet container, a ram cooperating therewith and means to extrude a billet and expel the stump thereof by movement of one only of said members.

31. In a machine for extruding metal, a billet container, a die removably associated with an end portion thereof, a die backing member for holding said die in operative position, and means for moving said member transversely of the machine to permit expulsion of the die from the container.

32. In a metal extruding means, a billet container, a die associated therewith, and a combined die backing and stump shearing member to hold said die in operative position.

33. In a metal extruding machine, a billet container supported for longitudinal movement, a piston to move the same in opposite directions, and a pair of levers connecting said piston to said container.

34. In a metal extruding machine, upright end frames, guide rods connecting said frames, a ram, means for operating the same, a billet container mounted on the guide rods, and a power operated lever system for shifting the billet container lengthwise, said lever system including a longitudinally shiftable member slidably mounted between said end frames.

35. The method of extruding metal, which includes extruding the metal through a shearing member and then moving the shearing member to sever the extruded metal from the remainder.

36. In a metal extruding machine, upright end frames, guide rods connecting said frames, a ram, means for operating said ram, a billet container mounted on said guide rods, and a power operated lever for shifting the billet container lengthwise, said lever being fulcrumed intermediate its ends to the machine frame.

37. In a metal extruding machine, the combination of a ram, a billet container, and means forming a backing for the die adapted to allow the stump to be expelled from the container without moving the container from its operative extruding position.

38. In a metal extruding machine, the combination of a ram, a billet container, and means forming a backing for the die adapted to allow the stump to be expelled from the container without moving the container from its operative extruding position, said means being capable of severing the stump from the extruded article.

39. In a machine for extruding metal, the combination of an extruding ram, a billet container, and a transversely movable die backing adapted to allow the stump to be expelled from the container without moving the container from its operative extruding position when said die backing is moved into one position, said means being adapted to sever the stump from the extruded article while being moved into such position.

40. In a metal extruding machine, a combined billet container and holder for a removable die, a die, and a die supporting member in abutment with the rear face of said die, said die being allowed to drop from said holder when said container and said abutting member are separated.

41. In a metal extruding machine, a combined billet container and a die holder having a die removably seated in an end thereof, and a member in abutment with the rear face of said die to support the same in its seated position, said die being allowed to drop from the seated position when said container and said abutting member are separated.

42. In a machine for extruding metal, a billet container having a die seat in an end thereof, a die removably mounted in said seat, and a member in abutment with the rear face of said die to support the same upon the seat, said member being adapted to allow said die to drop from said seat when said container and said abutting member are separated.

43. In a metal extruding machine, a ram, a billet container, a die supported by said container, and means movable across the die to successively form a backing for said die and to allow the disengagement of the same from said container.

44. In a metal extruding machine, a ram, a billet container, a die supported by said container, and means movable across the die to successively form a backing for said die, to cut off the remaining stump from the extruded article, and to allow the removal of the die and the severed stump from said container.

45. In a metal extruding machine, a ram, a billet container, a die supported by said container, and means movable across the die to successively form a backing for said die and to sever the extruded article from the remaining unextruded billet portion.

46. In a metal extruding machine, a ram, a billet container, a die supported by said container, and means movable across the die to successively form a backing for said die, to sever the extruded article from the remaining unextruded billet portion, and to carry the end of the extruded article to one side to allow the removal of the remaining unextruded billet portion from said container.

47. In a machine for extruding metal, a billet container, a die associated therewith, and means to retain said die in close association with said container, said means being transversely movable relatively to said die.

48. A machine of the character described, having a movable ram, a movable billet container having a die associated therewith, and means to retain said die in close association with said container wherein the unextruded billet portion may be ejected from the container by a forward movement of the ram or a backward movement of the container.

49. A machine of the character described, having a movable ram, a movable billet container having a die associated therewith and means to retain said die in close association with said container wherein the die and the unextruded billet portion may be ejected from the container by a forward movement of the ram or a backward movement of the container.

50. A machine of the character described, having a movable ram, a movable billet container having a die associated therewith, and means to retain said die in close association with said container, said means being movable to sever the extruded portion from the unextruded billet portion wherein the unextruded billet portion may be ejected from the container by a forward movement of the ram or a backward movement of the container.

51. A machine of the character described, having a movable ram, a movable billet container having a die associated therewith, and means to retain said die in close association with said container, said means being movable to release said die from association with said container, wherein the die and the unextruded billet portion may be ejected from the container by a forward movement of the ram or a backward movement of the container.

52. In a machine for extruding metal, a die and a die backing, said die backing being retained against movement longitudinally of said die, but adapted to move transversely thereof.

53. In a machine for extruding metal, a frame member having a transversely disposed guideway therein, a die and a die backing, said die backing being mounted in said guideway, and being shiftable to release said die from the supporting action thereof.

54. In a metal extruding machine, a frame member, a billet container, a die associated with said container, and means slidingly mounted upon said frame for supporting said die in close association with said container when in one position, and releasing said die when moved transversely thereof into another position.

55. In a metal extruding machine, a movable member adapted to contain a billet, a movable member adapted to extrude the material of said billet from said first mentioned member, and means to allow the ejection of the remaining stump by movement of one only of said members.

56. In a metal extruding machine, a billet container having a die supported thereby, and stump shearing means adapted to retain said die in supporting engagement with said container.

57. In a metal extruding machine, end frames, guide rods connecting said frames, a power operated ram, a billet container mounted on said guide rods, a power operated cross-head movably mounted on a guide rod, and a lever operatively connecting said billet container and said cross-head for shifting said billet container lengthwise.

58. In a metal extruding machine, a pair of end frames, guide rods connecting said frames, a ram, means for operating said ram, a billet container slidably mounted on said guide rods, a power operated cross-head slidably mounted on a guide rod, and means to operatively connect said cross-head and said billet container.

59. In a metal extruding machine, a pair of end frames, guide rods connecting said frames, a ram, means for operating said ram, a billet container slidably mounted on said guide rods, a power operated cross-head slidably mounted on a guide rod, a pivoted lever operatively connecting said billet container and said cross-head, and means pivotally connected to the machine frame to support said lever whereby said billet container is shifted lengthwise by movement of said cross-head.

60. In a metal extruding machine, a pair of end frames, guide rods connecting said frames, a power operated ram, a billet container mounted on said guide rods, a cross-head movably mounted on a guide rod, means to move said cross-head lengthwise, and a connecting member between said cross-head and said billet container whereby said billet container is moved lengthwise when said cross-head is moved.

61. In a metal extruding machine, a pair of end frames, guide rods connecting said frames, a power operated ram, a billet container mounted on said guide rods, a cross-head movably mounted on a guide rod, means to move said cross-head lengthwise, and a rocking lever having one end engaged by said cross-head and the other end thereof engaged by said billet container whereby said billet container is moved lengthwise when said cross-head is moved.

In witness whereof, I have hereunto set my hand, on the 15th day of February, 1921.

WALTER R. CLARK.